United States Patent
Xu et al.

(10) Patent No.: US 11,064,374 B2
(45) Date of Patent: *Jul. 13, 2021

(54) CSI FEEDBACK DESIGN FOR NEW RADIO

(71) Applicant: Convida Wireless, LLC, Wilmington, DE (US)

(72) Inventors: Tianyi Xu, San Jose, CA (US); Qian Zhang, Basking Ridge, NJ (US); Allan Y. Tsai, Boonton, NJ (US); Guodong Zhang, Woodbury, NY (US); Lakshmi R. Iyer, King of Prussia, PA (US); Qing Li, Princeton Junction, NJ (US)

(73) Assignee: Covida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,809

(22) Filed: Jun. 24, 2020

(65) Prior Publication Data

US 2020/0322816 A1 Oct. 8, 2020

Related U.S. Application Data

(63) Continuation of application No. 16/323,896, filed as application No. PCT/US2017/046573 on Aug. 11, 2017, now Pat. No. 10,735,980.

(Continued)

(51) Int. Cl.
*H04B 7/02* (2018.01)
*H04W 24/02* (2009.01)
(Continued)

(52) U.S. Cl.
CPC .......... *H04W 24/02* (2013.01); *H04B 7/0408* (2013.01); *H04B 7/0417* (2013.01); *H04B 7/0456* (2013.01); *H04B 7/0626* (2013.01)

(58) Field of Classification Search
CPC ... H04W 24/02; H04B 7/0417; H04B 7/0626; H04B 7/0408; H04B 7/0456
(Continued)

(56) References Cited

U.S. PATENT DOCUMENTS

2013/0039345 A1 2/2013 Kim et al.
2017/0104517 A1 4/2017 Kakishima et al.
(Continued)

FOREIGN PATENT DOCUMENTS

KR 10-2014-0129147 A 11/2014
KR 10-2015-0104556 A 9/2015

OTHER PUBLICATIONS

3GPP TR 22.863 V0.3.1, "Feasibility Study on New Services and Markets Technology Enablers—Enhanced Mobile Broadband", Release 14, Jun. 2012, 13 pages.
(Continued)

*Primary Examiner* — Don N Vo
(74) *Attorney, Agent, or Firm* — BakerHostetler

(57) ABSTRACT

It is recognized herein that as the number of transmit antennas in cellular systems (e.g., NR or 5G systems) increase, the Channel State information (CSI) feedback overhead may increase to unacceptable levels, and the current CSI feedback might not support beamforming training for NR. Embodiments described herein provide an enhanced and more efficient design for Channel State Information feedback as compared to current approaches.

11 Claims, 9 Drawing Sheets

Related U.S. Application Data

(60) Provisional application No. 62/373,645, filed on Aug. 11, 2016.

(51) Int. Cl.
    *H04B 7/0408* (2017.01)
    *H04B 7/0417* (2017.01)
    *H04B 7/0456* (2017.01)
    *H04B 7/06* (2006.01)

(58) Field of Classification Search
    USPC .......................................... 375/267
    See application file for complete search history.

(56) References Cited

U.S. PATENT DOCUMENTS

2017/0164226 A1    6/2017    Wei et al.
2017/0288758 A1*  10/2017  Kakishima ........... H04B 7/0617
2018/0220406 A1    8/2018    Mizusawa
2018/0262250 A1*  9/2018   Kim ....................... H04B 7/063
2019/0029071 A1    1/2019    Moon et al.
2019/0149215 A1*  5/2019   Nilsson ................ H04B 7/0639
                                                   375/262
2019/0199412 A1    6/2019    Koskela et al.

OTHER PUBLICATIONS

3GPP TR 38.913 V0.2.0 "Study on Scenarios and Requirements for Next Generation Access Technologies" Feb. 2016, 19 pages.
3GPP TS 36.211 V13.1.0, "Evolved Universal Terrestrial Radio Access (E-UTRA)" Release 13, Mar. 2016, 155 pages.
ITU-R "IMT Vision—Framework and Overall Objectives of the Future Development of IMT for 2020 and Beyond" Recommendation ITU-R M.2083-0, Sep. 2015, 21 pages.

* cited by examiner

CSI FEEDBACK DESIGN FOR NEW RADIO

CROSS-REFERENCE TO RELATED APPLICATIONS

This application a continuation of U.S. patent application Ser. No. 16/323,896 filed Feb. 7, 2019 which is the National Stage Application of International Patent Application No. PCT/US2017/046573 filed Aug. 11, 2017, which claims the benefit of priority to U.S. Provisional Patent Application No. 62/373,645, filed Aug. 11, 2016, the disclosures of which are incorporated herein by reference.

BACKGROUND

In Long Term Evolution (LTE), multi-antenna techniques are used to achieve improved system performance, which may include improved system capacity (e.g., more users per cell), improved coverage (e.g., larger cells), and improved service provisioning (e.g., higher per-user data rates). The availability of multiple antennas at the transmitter and/or the receiver can be utilized in different ways to achieve different objectives, such as, for example, objectives related to antenna diversity, antenna beamforming, and antenna spatial multiplexing. For example, multiple antennas at the transmitter and/or the receiver can be used to provide antenna diversity against fading on the radio channel. Multiple antennas at the transmitter and/or the receiver can be used to "shape" the overall antenna beam in a certain way, which can be referred to as antenna beamforming. For example, antenna beamforming can be used to maximize the overall antenna gain in the direction of the target receiver or to suppress specific dominant interfering signals. Multiple antennas can be used for antenna spatial multiplexing, which refers to the simultaneous availability of multiple antennas at the transmitter and receiver to be used to create multiple parallel communication "channels" over the radio interface. Antenna spatial multiplexing can provide high data rates within a limited bandwidth, which is referred to as Multiple-Input and Multiple-Output (MIMO) antenna processing.

Turning now to downlink (DL) reference signals in LTE, DL reference signals (RSs) are predefined signals occupying specific resource elements (REs) within the downlink time-frequency RE grid. LTE defines several types of DL RSs that are transmitted in different ways for different purposes. For example, a cell-specific reference signal (CRS) can be used: (1) by terminals (UEs) for channel estimation for coherent demodulation of DL physical channels; (2) by UEs to acquire Channel State Information (CSI); or (3) by UEs as the basis for measurement of cell-selection and handover. DeModulation Reference Signals (DM-RSs) are another example of a DL RS. A DM-RS can be referred to as User Equipment (UE)-specific reference signals that are intended to be used by UEs for channel estimation for coherent demodulation of DL channels. DM-RSs may be used for channel estimation by a specific UE, and then transmitted within the RBs specifically assigned for PDSCH/EPDCCH transmission to that UE. DM-RSs are associated with data signals and precoded prior to the transmission with the same precoder as data. Channel State Information Reference Signals (CSI-RSs) are another example of a DL RS. CSE-RSIs are intended to be used by UEs to acquire CSI for channel-dependent scheduling, link adaptation, and multi-antenna transmissions.

Turning now to uplink reference signals, similar to LTE DL, reference signals are also used in LTE UpLink (UL). LTE defines UL Demodulation Reference Signals (DM-RSs) and UL Sounding Reference Signals (SRSs). UL Demodulation Reference Signals (DM-RSs) are used by the base station for channel estimation for coherent demodulation of the Physical Uplink Shared CHannel (PUSCH) and the Physical Uplink Control CHannel (PUCCH). In LTE, DM-RS are only transmitted within the RBs specifically assigned for PUSCH/PUCCH transmission and span the same frequency range as the corresponding physical channel. UL Sounding Reference Signals (SRS) are used by the base station for CSI estimation for supporting uplink channel-dependent scheduling and link adaptation. An SRS may also be used for the base station to obtain CSI estimation for DL under the case of channel reciprocity.

With respect to CSI feedback in LTE, DL channel-dependent scheduling is a feature of LTE. In DL channel-dependent scheduling, the DL transmission configuration and related parameters can be selected based on the instantaneous DL channel condition, including the interference situation for example. To support DL channel-dependent scheduling, a given UE provides the CSI to the evolved Node B (eNB). The eNB uses the information for its scheduling decisions. The CSI may consist of one or more pieces of information, such as, a rank indication (RI), a precoder matrix indication (PMI), or a channel-quality indication (CQI). The RI may provide a recommendation on the transmission rank to use, or may provide a number of preferred layers that should be used for PDSCH transmission to the UE. The PMI may indicate a preferred precoder to use for PDSCH transmission. The CQI may represent the highest modulation-and-coding scheme to achieve a block-error probability of 10%, for example at most. Together, a combination of the RI, PMI, and CQI forms a CSI feedback report to the eNB. The information included in the CSI report may depend on the UE's configured reporting mode. For example, in some cases, RI and PMI do not need to be reported unless the UE is in a spatial multiplexing multi-antenna transmission mode.

A CSI report may be configured to be periodic or aperiodic by radio resource control (RRC) signaling. In some cases, CSI reporting using PUSCH is aperiodic. For example, aperiodic reporting may be triggered by downlink control information (DCI) formats, and can be used to provide more detailed reporting via PUSCH. A given UE may be semi-statically configured by a higher layer to feedback CQI, PMI, and corresponding RI, on the same PUSCH using one of various CSI reporting modes. Examples of various CSI reports modes are depicted in Table 1 below.

TABLE 1

Example CQI and PMI Feedback Types for PUSCH CSI Reporting Modes

|  |  | PMI Feedback Type | | |
| --- | --- | --- | --- | --- |
|  |  | No PMI | Single PMI | Multiple PMI |
| PUSCH CQI Feedback Type | Wideband (wideband CQI) | Mode 1-0 | Mode 1-1 | Mode 1-2 |
|  | UE Selected (subband CQI) | Mode 2-0 |  | Mode 2-2 |
|  | Higher Layer-configured (subband CQI) | Mode 3-0 | Mode 3-1 | Mode 3-2 |

Referring to Table 1, for each of the transmission modes in Table 1, different reporting modes are defined and supported on PUSCH.

With respect to periodic CSI Reporting using PUCCH, a given UE may be semi-statically configured by higher layers to periodically feedback different CSI components (e.g., CQI, PMI, and/or RI) on the PUCCH using, for example, the reporting modes shown in Table 2.

TABLE 2

Example CQI and PMI FeedbackTypes for PUCCH CSI Reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Referring to Table 2, for each of the transmission modes in Table 2, different periodic CSI reporting modes are defined and supported on PUCCH.

With respect to three-dimensional (3D) beam systems (which can also be referred to as beamforming systems), a 3D beam system can explore both horizontal and elevation (vertical) angles. In addition, 3D beamforming can achieve a better degree of freedom as compared to traditional 2D beamforming systems that only consider horizontal angles. The 3D beamforming system may use Active Antenna System (AAS) technology to adjust antenna weights of horizontal antenna ports, and also the antenna elements in the vertical direction. A 3D beam can be characterized by a beam emission direction and a beamwidth ΔB. The beam emission direction can be described by the horizontal and elevation angles, where ψ represents the horizontal angle and θ represents the elevation angle. The beamwidth ΔB indicates how wide a 3D beam can span. In practice, a 3D beam is distinguished by its 3 dB beamwidth. Thus, to summarize, a 3D beam can be characterized by the parameters of horizontal angle, elevation angle, and beamwidth (ψ, θ, ΔB).

Referring to FIG. 1, an example 3D beam 102 is depicted. As shown, the emission direction of the beam 102 can be distinguished by the horizontal angle 104 (between the beam's projection on the x and y plane and the x-axis) and the elevation angle 106 (between the beam and z-axis).

Turning now to Full-Dimension (FD) Multiple-Input and Multiple-Output (MIMO), FD-MIMO typically includes a base station with a two-dimensional antenna array that supports multi-user joint elevation and azimuth beamforming. This may result in higher cell capacity compared to conventional systems in 3GPP release 12. In some cases, using FD-MIMO techniques, LTE systems can achieve 3-5× performance gain in cell capacity and cell edge throughput.

LTE release 10 has introduced a CSI-RS that can be used for DL channel CSI estimation for the UEs. There are up to 8 antenna ports specified in release 10 and up to 16 antenna ports specified in release 13.

SUMMARY

It is recognized herein that as the number of transmit antennas in cellular systems (e.g., NR or 5G systems) increase, the reference signal (RS) overhead may increase to unacceptable levels. Embodiments described herein provide an enhanced and more efficient design for Channel State Information (CSI) feedback as compared to current approaches.

In an example embodiment, a user equipment (UE) selects a subset of antenna ports periodically or aperiodically. In some cases, the antenna ports do not correspond to physical antennas. For example, the antenna ports may be logical entities that are distinguished by their reference signal sequences. The ports are used for future DL transmission. The UE indicates the selected antenna ports to a Transmission and Reception Point (TRP), which can be referred to generally as a new radio (NR) node. For example, the TRP can be indicated via a TRP identity (ID). The TRP ID can be explicitly signaled via radio resource control (RRC) signaling or a media access control (MAC) control element (CE) configuration. Alternatively, the TRP ID can be implicitly signaled via a reference signal. UE-centric antenna port selection is used herein to refer to cases in which the UE selects antenna ports. The CSI report may include a channel-quality indication (CQI), a precoder matrix indication (PMI), and/or a rank indication (RI), spatial information (SI) (e.g., a quasi-co-location (QCL) indication between antenna ports/beams), and the CSI report might only generated based on the selected antenna ports. Ports may be selected based on various criteria, as described herein. The UE may send an antenna port index report to the NR node to indicate to the NR node which ports are preferred. In another embodiment, the NR node selects a subset of antenna ports for each UE to use for future DL transmissions. This is referred to as network-centric antenna port selection.

In an example embodiment, a new CSI reporting contains beam index feedback to support beamforming training. In some cases, a given UE may report only the beam index or the UE may report the beam index and CQI. After receiving the UE's report, an NR node may choose the best beam for data transmission or other beams in consideration of another UE's performance. Thus, for example, an apparatus (e.g., a UE) may select one or more beams from a plurality of beams provided by nodes in the network. The apparatus may send, to the nodes, a beam index feedback with a CSI report that indicates the selected one or more beams. Thereafter, the apparatus may receive, until a beam is reselected for example, the channel state information reference signal and downlink (DL) data via only the selected one or more beams.

In one embodiment, an apparatus comprises a processor, a memory, and communication circuitry. The apparatus is connected to a network, for instance a 5G network, via its communication circuitry. The apparatus further comprises computer-executable instructions stored in the memory of the apparatus which, when executed by the processor of the apparatus, cause the apparatus to perform operations. The apparatus, which may be a UE, can receive, from a node on the network, a channel state information reference signal associated with a full channel estimation. Based on the full channel estimation, the apparatus may select one or more antenna ports from a plurality of antenna ports. The apparatus may send, to the node, an antenna port index report that indicates the selected one or more antenna ports. Thereafter, until an antenna port is reselected, the apparatus may receive the channel state information reference signal via only the selected one or more antenna ports. In some cases, the one or more antenna ports are selected based on predetermined criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
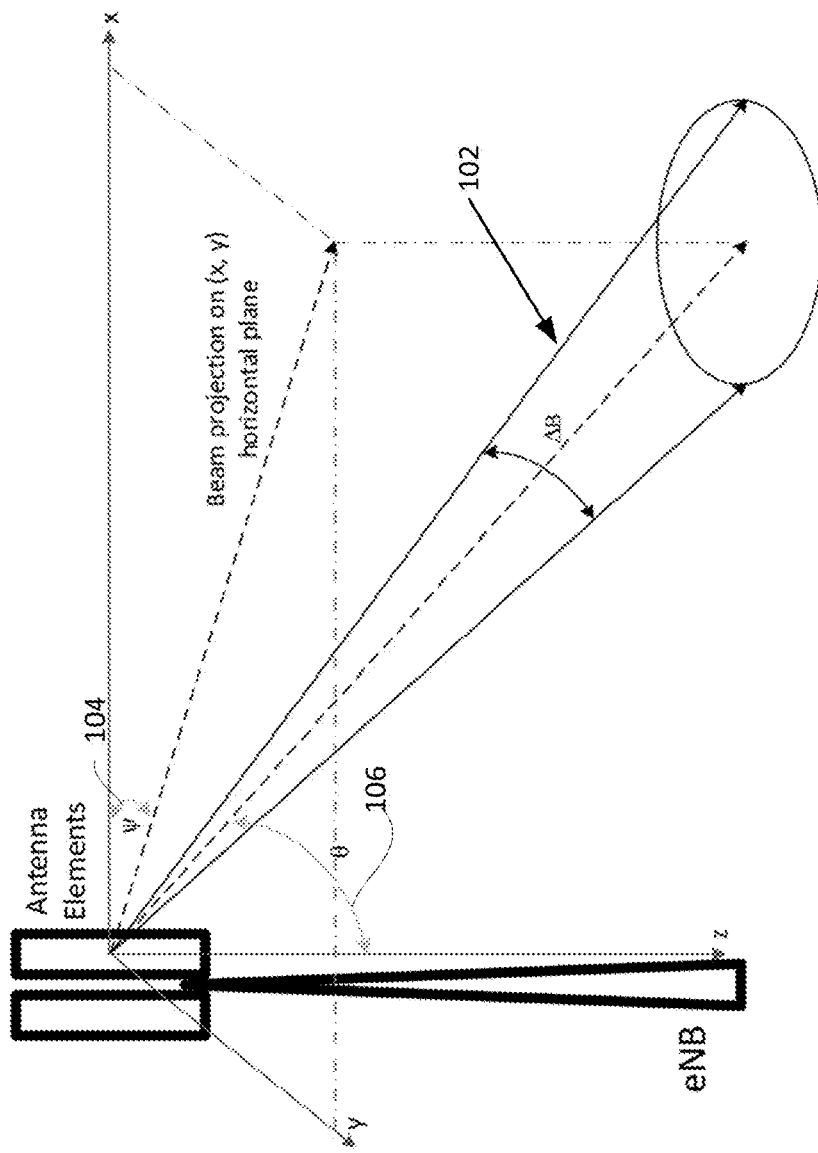
FIG. 1 depicts an example three-dimensional (3D) beam.

As further background, the 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access may consist of a new, non-backwards compatible radio access in a new spectrum below 6 GHz, and it may include different operating modes that can be multiplexed together in the same spectrum to address a broad set of 3GPP NR use cases with diverging requirements. The ultra-mobile broadband may include cmWave and mmWave spectrum that will provide the opportunity for ultra-mobile broadband access for, for example, indoor applications and hotspots. In particular, the ultra-mobile broadband may share a common design framework with the flexible radio access below 6 GHz, with cmWave and mmWave specific design optimizations.

As an initial matter, 3D Multiple-Input and Multiple-Output (MIMO) can be referred to as 5G MIMO herein, such that the terms 3D MIMO and 5G MIMO can be used interchangeably without limitation.

It is recognized herein that a straightforward approach for implementing 3D MIMO would be to assign one Channel State Information (CSI) Reference Signal (RS) (CSI-RS) port per each transmit antenna element. It is further recognized herein that in this approach, however, the number of transmit antennas at a base station will be limited by the available number of CSI-RS ports, and by the available resource elements in the time-frequency resource block, which might not be possible from the practical system design perspectives with larger number of antennas at the base station. Currently, there are two approaches for a CSI-RS design for Full Dimension (FD) MIMO (FD-MIMO) to support up to 16 antenna ports: beamformed CSI-RS and non-precoded CSI-RS schemes, and both of which are now described by way of background.

With respect to current approaches to beamformed CSI-RS, in order to acquire relatively accurate 3D MIMO channel estimation and CSI, CSI-RS symbols transmitted on the transmit antenna elements in every column are precoded with the elevation beam weighting vector. Hence, for each elevation beam, only one CSI-RS port is assigned to the transmit antenna elements in one column. All the horizontal ports are used and different CSI-RS ports are used by different columns. Each column is precoded with a weighting vector to form the desired elevation beam.

With respect to current approaches to non-precoded CSI-RS, which can also be referred to as Kronecker-Product (KP) based CSI framework, KP-based CSI-RS is based on the assumption that the 3D channel between an eNB and a UE can be approximated by the KP between the azimuth and elevation domain channels. The CSI-RS ports are transmitted on elements in the vertical and horizontal axes of the array. A UE can be configured with multiple CSI processes, for example, one associated with the azimuth CSI-RS resource and another associated with the elevation CSI-RS resource. These CSI processes are used for obtaining precoder information for the azimuth and the elevation dimensions separately from the UE. At the eNB, the azimuth and the elevation precoder information is used to form a 2D precoder with a Kronecker structure. Thus, with respect to the KP-based CSI-RS scheme, the total number of CSI-RS ports required is equal to $N_h + N_v - 1$, as compared to $N_h N_v$ when using the straightforward approach.

It is recognized herein that the number of transmit antennas at the base station may be increased, for example, to 32 antenna ports or greater. Further, beamformed CSI-RS and non-precoded CSI-RS may improve the above-summarized schemes to support more antenna ports. Further still, with respect to future cellular systems, it is possible that a significantly increased number of antennas may be implemented at the base station to further increase cell capacity, for example, by 10× performance gain. For example, an eNB may use antenna arrays with a few hundred antennas simultaneously serving many UEs in the same time-frequency resource. Without being bound by theory, in an example massive MIMO system, as the number of the transmit antennas increases to infinity (very large), cross-correlation of two random channel realizations decreases to zero, and there will be no multi-user interference resulting from co-scheduling and multiple access. This may greatly improve the system throughput, and it may be energy-efficient, secure, robust, and efficient (e.g., use spectrum efficiently), which makes massive 3D MIMO a potentially key enabler for future cellular systems.

Turning now to downlink control information (DCI), the DCI is currently formed and transmitted in a Physical Downlink Control Channel (PDCCH). The DCI format tells the UE how to get its data that is transmitted on the Physical Downlink Shared Channel (PDSCH) in the same subframe. It carries the details for the UE such as, for example, number of resource blocks, resource allocation type, modulation scheme, redundancy version, coding rate, etc., which may help a given UE find and decode the PDSCH from the resource grid.

As described further below, embodiments described herein may help enable enhanced mobile broadband (eMBB), Ultra-reliable and low latency communications (URLLC), and massive Machine Type Communications (mMTC). Example deployment scenarios for eMBB include, indoor hotspots, dense urban areas, rural areas, urban macro areas, and high speed areas.

A high density scenario generally refers to a situation with a high volume of data traffic per area (traffic density) or a high number of connections (connection density). An example of a typical case is in an indoor office scenario, where users frequently upload and download data from the company's server, and real-time video conferences are also expected. Another example use case is a hotspot scenario with high user density, wherein in the density may depend on the time of day (e.g., morning, evening, weekday vs. weekend, etc.) and/or the location (e.g., pedestrians in shopping mall, downtown street, stadium, users in buses in dense city center). In such scenarios, users may be indoor or outdoor with static or low to medium mobility. High volume and high capacity multi-media traffic uploading and downloading towards the Internet might be expected.

A higher user mobility generally refers to a user case in which enhanced mobile broadband for fast moving devices, such as vehicles (e.g., up to 200 km/h) or trains (e.g, up to 500 km/h) are required. The typical user applications include high quality mobile internet access, for example, to watch a high definition (HD) video, play an online game, participate in video conferencing, or receive enhanced navigation through instant and real-time information. Such mobile broadband may be provided to the fast moving users in various ways. For example, if an on-board base station (or a relay) is available, the cellular network may be able to provide a high-rate link to the road vehicle/train/aircraft. If an on-board station is not available, the user equipment in a given fast moving road vehicle or train may have a direct link to the cellular network.

It will be understood that embodiments described herein may also be to the use case of Ultra-Reliable and Low Latency Communications (URLLC), in which accurate CSI feedback may be needed for highly reliable transmission and sufficient coverage.

In the current 3GPP system, a UE performs the DL channel quality estimation using the CSI-RS transmitted from the base station. Based on the channel estimation, the UE generates a CSI report that includes a channel-quality indication (CQI), a precoder matrix indication (PMI), and/or a rank indication (RI) depending on higher layer configuration and transmission modes.

Generally, to take advantage of more transmit antenna ports, a codebook with a larger size may be used, whereby more bits may be required for PMI reporting, in some cases. For example, the size of PMI reporting may be 8 to 11 bits for 16 transmit antenna ports depending on different numbers of layers. For example, for 4 transmit antenna ports, the size of PMI reporting may be 4 to 8 bits. In some cases, the antenna ports do not correspond to physical antennas. For example, the antenna ports referenced herein may be logical entities that are distinguished by their reference signal sequences.

For example, in some cases, with respect to single layer transmission, the sizes of PMI reporting for 4 and 16 transmit antenna ports are 8 and 11 bits, respectively. With respect to NR MIMO, for example due to the massive number of transmit antennas, the antenna ports may be more than 16 ports (e.g., 32, 64, 128, 256 or 1024 ports). Thus, it is recognized herein that the size of the codebook and the size of PMI reporting might increase dramatically. Moreover, because of the large overhead of CSI-RS, it is recognized herein that the full downlink channel estimation may become unrealistic in some cases. In addition to the PMI feedback overhead increasing for massive MIMO, the other feedback (e.g., CQI, RI, etc.) may also contribute to an issue with the CSI feedback overhead.

In some cases that include high traffic density and high user mobility, to achieve a reliable, high throughput eMBB DL transmission, frequent CSI reporting might be necessary. In a high connection density scenario, the large amount of users may cause an increasing of CSI reporting in the network. It is recognized herein that the increased overhead of CSI reporting may lead to a substantial loss in maximum data throughput, and may lead to a failure to meet eMBB high data rates and high density requirements.

Embodiments described herein include CSI reporting that achieves desirable DL performance while keeping the overhead of CSI sufficiently low. CSI reports, in accordance with various embodiments, may include a channel-quality indication (CQI), a precoder matrix indication (PMI), and/or a rank indication (RI), spatial information (SI) (e.g., such as a quasi-co-location (QCL) indication between antenna ports/beams).

Figure 2:
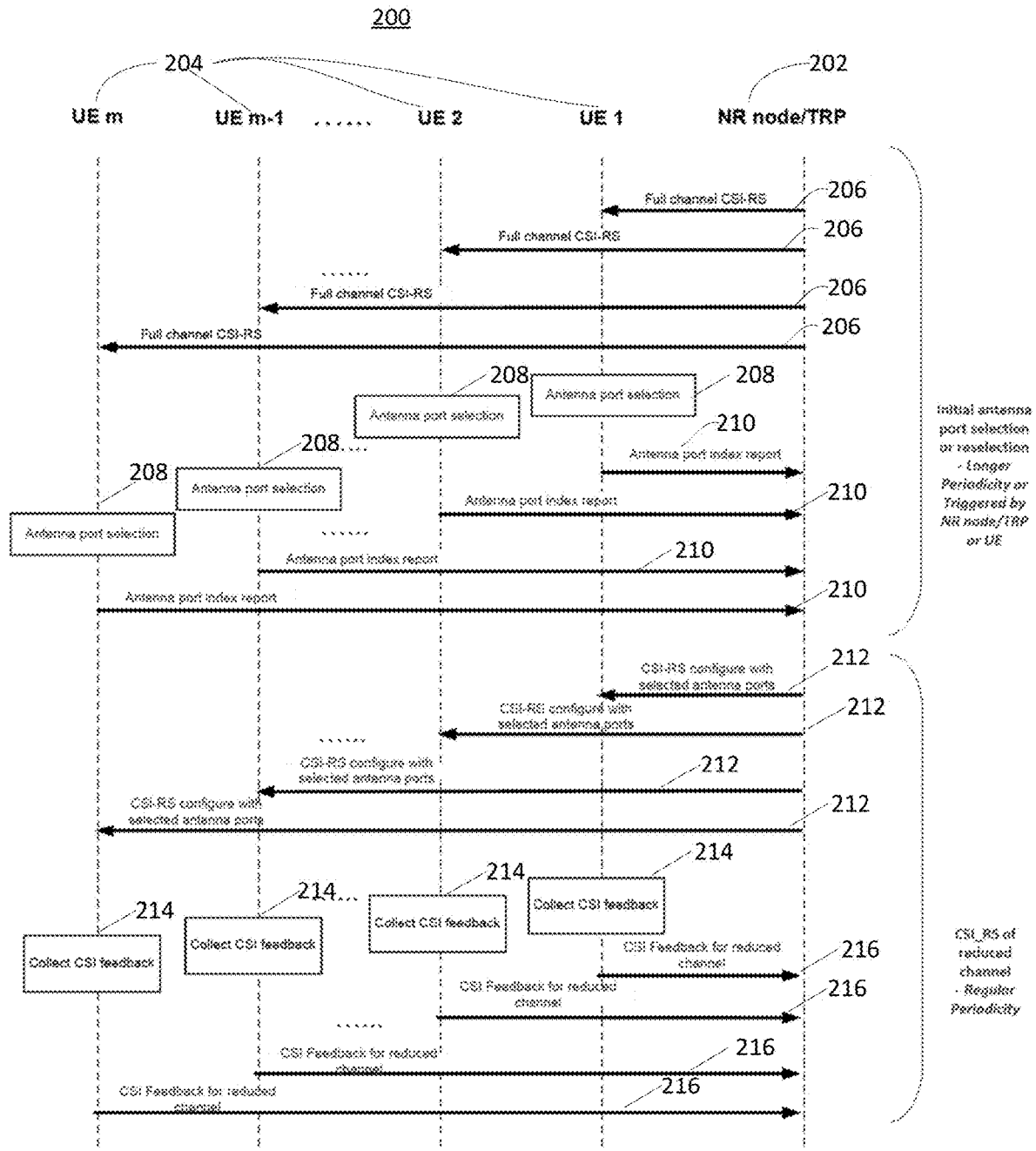
FIG. 2 is a call flow for channel state information (CSI) feedback with UE-centric antenna port selection in accordance with an example embodiment.

Referring now to FIG. 2, an example system 200 is shown that includes an NR node 202 and a plurality of mobile devices or UEs 204 which communicate in a network. The terms NR node, eNB, and Transmission and Reception Point (TRP) may be used interchangeably herein, without limitation. To illustrate, FIG. 2 depicts the NR node 202 as an NR/TRP 202. It will be appreciated that the example system is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 2, and all such embodiments are contemplated as within the scope of the present disclosure.

Still referring to FIG. 2, in accordance with the illustrated embodiment, CSI feedback overhead is reduced with UE-centric antenna port selection. In accordance with the illustrated embodiment, for example to enable UE-centric antenna port selection, the NR node 202, at 206, transmits a Channel State Information Reference Signal (CSI-RS) through at least one, for instance all, available ports for NR CSI-RS. Thus, each UE of the plurality 204 can obtain a full channel estimation. The NR node may transmit the NR CSI-RS at 206 for the full channel estimation with a long duration. Alternatively, or additionally, NR CSI-RS at 204 may be triggered aperiodically by the NR node 202, or by a request from a given UE. The CSI-RS that is sent (at 206) to a given UE of the plurality 204 may be specific to the UE or may be non-UE specific. The CSI-RS at 206 may be unprecoded or may be a beamformed CSI-RS. Thus, the UE 202 may receive, from a node on the network a CSI-RS associated with a full channel estimation.

Based on the full channel estimation, at 208, each of the UEs 204 may select the best antenna ports, from a plurality of antenna ports, according to various pre-defined criteria, which is described further below. In accordance with the illustrated example, at 210, each UE signals (e.g., sends) the indices of the selected antenna ports to the NR node/TRP 202. These indices may be transmitted through an uplink control channel or via other messages. For example, an antenna port index report may indicate the selected one or more antenna ports. For example, the uplink control channel can be a new or reused UCI format carried on PUCCH or PUSCH, or any uplink control channels in a 5G system for example. Example details related to signaling the indices from the UE is described below. Still referring to FIG. 2, it will be understood that the above-described messaging may be performed periodically with a longer duration than the CSI reporting duration, or aperiodically triggered by, for example, the NR node/TRP 202 or the UEs 204 (via a request). In an example, the CSI-RS may be received by the UE 202 via only the selected one or more antenna ports until an antenna port is re-selected.

With continuing reference to FIG. 2, upon selecting the antenna ports, a given UE may calculate (at 214) and report (at 216) the CQI and/or PMI and RI on the selected antenna ports until the next antenna port re-selection is triggered. In some cases, at 212, the NR node 202 may send the CSI-RS only on the selected antenna ports, thereby reducing CSI-RS overhead until the next antenna port re-selection. An antenna port re-selection may be scheduled periodically, or may be triggered by the NR node 202 or a given UE.

In one embodiment, a new field (referred to as "antennaPortSelectionMode") is used in radio resource control (RRC) signaling. The new field may have a length of 2 bits, or may have any alternative length as desired. In one example, the first bit of the new field indicates whether antenna port selection (APS) is enabled. When it is enabled, the second bit may indicate whether UE-centric or network-centric APS is performed. As described further below, in network-centric APS, the network may select the antenna ports for DL transmission. In an example UE-centric APS, the UE selects the antenna ports based on a full channel CSI-RS.

As described above, an initial antenna port selection or an antenna port reselection may be triggered by the NR node 202 or one of the UEs 204. In one embodiment, a new field (referred to as "aps-trigger") is defined. For example, this field may have a length of 1 bit (or more), and it may be signaled as a new field in DCI (or UCI) formats via downlink (or uplink) control channels, RRC signaling, or a media access control (MAC) layer control element (CE). In some cases, upon receiving the trigger, the NR node 202 transmits the CSI-RS through available antenna ports, for instance all available antenna ports, and the UEs 204 perform the above-described operations (with reference to FIG. 2) to reselect antenna ports.

Turning now to examples of Antenna Port Selection Criteria (APSC), to reduce the CSI feedback overhead, a given UE may select a subset of the available antenna ports, for instance at 208. The subset may be used in the CSI feedback calculation at 214 and future downlink transmissions. Example criteria is described below, but it will be understood that other criteria may be used as desired. The criteria may be categorized into fixed-number APSC and dynamic-number APSC, where the difference between the categories is whether the number of selected antenna ports is fixed or dynamic.

With respect to fixed-number APSC, the number of selected antenna ports may be configured by higher layer signaling or transmitted to a given UE via NR downlink control channels. For example, the number of selected ports: may be pre-defined in a new field "numberSelectedAntennaPorts" in RRC signaling; may be updated through a MAC CE; or may be added to other DCI formats as new fields or included in a new special DCI format that is sent from the NR node 202 to the UE via the NR DL control channel.

Referring to Table 3 below, an example "number of selected antenna ports" field in a new or reused DCI format is shown. As described above, this information can be periodically or aperiodically transmitted, for example, via PDCCH or ePDCCH or any future 5G (DL) control channels.

TABLE 3

Example of Number of Selected Antenna Ports Field in a DCI Format

| Field Name | Length (Bits) |
|---|---|
| Number of Selected Antenna Ports | 4 |
| MCS | 5 |
| PMI confirmation for precoding | 1 |
| ... | ... |

Given the number of selected antenna ports, in some cases, a given UE may obtain the optimal subset of antenna ports by solving the following optimization problem:

$$\underset{S}{\text{maximize}}\, f(S) \text{ subject to: } S \subset A \text{ and } |S| = s, \qquad (1)$$

where A is the set of all available antenna ports, and s is the number of selected antenna ports. The objective function $f(S)$ may be defined in various ways, for example and without limitation:

- The capacity of the channel between the antenna ports in S and the receive antenna.
- The received SNR (or CQI) of the channel between the antenna ports in S and the receive antenna.
- The negative of the bit error rate (BER) of the channel between the antenna ports in S and the receive antenna.

With respect to dynamic-number APSC, the number of selected antenna ports is not fixed, and may depend on channel conditions and configurations. In one example, the NR node/TRP 202 may signal both or either one of the maximum and minimum numbers of selected antenna ports ($s_{max}$ and $s_{min}$) that a given UE must support, and the UE selects a number N antenna ports such that $s_{min} \leq N \leq s_{max}$. Thus, UE-selected one or more antenna ports may total a number at least equal to the minimum number and no greater than the maximum number. The upperbound and lowerbound of antenna ports may be predefined in RRC signaling or via a MAC CE, for example, or transmitted to the UE as new fields in a DCI format or a new DCI format via NR DL control channels. An example of maximum and minimum numbers of selected antenna ports fields in a new or reused DCI format is illustrated in Table 4.

TABLE 4

Example of Max and Min Numbers of Selected
Antenna Ports Fields in a DCI Format

| Field Name | Length (Bits) |
|---|---|
| Maximum number of selected antenna ports | 4 |
| Minimum number of selected antenna ports | 4 |
| MCS | 5 |
| PMI confirmation for precoding | 1 |
| ... | ... |

Referring to Table 4, the optimization problem from (1) may become:

$$\underset{S}{\text{maximize}}\ \frac{f(S)}{|S|}\ \text{subject to:}\ S \subset A\ \text{and}\ s_{min} \le |S| \le s_{max}, \quad (2)$$

where $s_{min}$ and $s_{max}$ are the minimum and maximum numbers of selected antenna ports, respectively.

As another example of dynamic-number APSC, a given UE may select antenna ports that exceed one or more thresholds (e.g., an SNR threshold) to enhance the NR node/TRP's scheduling flexibility. Similarly, the threshold may be predefined in RRC signaling or sent to the UE as new fields in a DCI format or a new DCI format via PDCCH, ePDCCH, or any future 5G downlink control channel. In some cases, the threshold may be applied together with other APSC to discard weak antenna ports, for example, by selecting s antenna ports from those having a SNR greater than the threshold:

$$\underset{S}{\text{maximize}}\ f(S)\ \text{subject to:}\ S \subset A'\ \text{and}\ |S| = s, \quad (3)$$

where A' is the set of antenna ports whose SNR is greater than the threshold.

With respect to a frequency non-selective channel, the objective function f(S) may be the same for all subbands, and the antenna port selection may be optimized for the wideband. With respect to a frequency selective channel, when subband antenna port selection is required, in some cases, the antenna port selection may be optimized for each subband, and sent to the NR node/TRP individually. In some cases in which wideband antenna port selection is required for a frequency selective channel, the objective function may be the summation of the objective functions on each subband, for example:

$$f(S) = \sum_{i=1}^{K} f_i(S), \quad (4)$$

where K is the number of subbands and $f_i$ is the objective function at the i-th subband.

With respect to two-level beamforming training, the wider beam training (or beam sweeping) and the narrower beam training (or beamforming training) may be configured individually as above. In some cases, each beamforming level may be configured to either fix-number APSC or dynamic-number APSC. For example, the numbers of selected antenna ports $s_{wider}$ and $s_{narrower}$ for the wider and narrower beam training, respectively, may be signaled to the UE. Then the UE may select $s_{wider}$ and $s_{narrower}$ antenna ports in the wider and narrower beam training, respectively.

Turning now to the antenna port index report that is sent at 210 in FIG. 2, for example, upon selecting antenna ports (at 208), for instance according to the criteria described above, the UE may need to feedback the antenna port selection to the NR node/TRP 202. In some cases, this antenna port selection is used in downlink RS and data transmissions until the next antenna port selection is available. Example mechanisms to feedback the antenna port selection to the NR node/TRP 202 are now discussed.

In one example, the selected antenna port indices are represented by a bit-map. For example, an N-bit binary sequence may be used to feedback the selected antenna port indices for N available antenna ports, where each bit represents one antenna port and "1" indicates that the corresponding antenna port is selected. Furthermore, for fixed-number APSC, to select s antenna ports out of N available antenna ports, there are a total of $$\binom{N}{s}$$

possible selections. The selection may represented by a $$\left\lceil \log_2 \binom{N}{s} \right\rceil$$

-bit binary sequence, which is less than N bits for the bit-map representation. By way of example, to select four out of a total of 16 available antenna ports, it may require $$\left\lceil \log_2 \binom{16}{4} \right\rceil = 11$$

bits to feedback the antenna port selection; less than 16 bits for the bit-map representation.

In another example embodiment of an antenna port index report, the total number of possible antenna port selections is decreased, for example, to reduce the overhead of the antenna port index report and to reduce the complexity of finding the best available antenna port selection. In some cases, the optimization problem (1) can be expressed as $$\underset{S}{\text{maximize}}\ f(S)\ \text{subject to:}\ S \in \mathcal{F},$$

where $\mathcal{F}$ is a family of sets over A, e.g., a set of subsets of A. According to different $\mathcal{F}$, there may be different forms of antenna port index reports to reduce the overhead. For example, the available antenna ports may be partitioned into groups $A_1, A_2, \ldots, A_s$, such that only one antenna port can be selected from each group, e.g., $$\mathcal{F} = \{(a_{1,j_1}, a_{2,j_2}, \ldots, a_{s,j_s}), \forall a_{i,j_i} \in A_i\}$$

Thus, in an example, s $$\left\lceil \log_2 \frac{N}{s} \right\rceil$$

bits may represent every possible selection for N available antenna ports. For example, to select 4 out of 16 antenna ports, an 8-bit binary sequence may be sufficient to represent the selection, which is less than the 16-bit binary sequence for a bit-map.

As yet another example, antenna port selections may be predefined, and a given UE may be required to choose a selection from them and only feedback the index associated with the selection. In this case, $\mathcal{F}$ is the set of all predefined antenna port selections. The required size of the feedback may depend on $\mathcal{F}$, which is less than the size of the bit-map representation. It will be understood that the above-described mechanisms may reduce the overhead of the antenna port index report. They may also, in some cases, limit the UE's flexibility to make antenna port selections.

As described above, antenna port selection (APS) reporting may be periodic or aperiodic. A higher layer may configure APS for a given UE. With respect to spatial multiplexing transmission modes, the APS may be reported when the UE is configured with PMI/RI reporting. For aperiodic CQI/PMI reporting, in some cases, APS reporting is transmitted only if the configured CSI feedback type supports APS reporting.

The channel coding for APS reporting may be chosen for high reliability (e.g., like RI reporting). For example, if the APS feedback consists of 1-bit or 2-bits of information, it may be encoded by a repetition code with some scrambling bits. If APS reporting consists of more information bits, it may be encoded by a linear error-correcting code (e.g., Reed-Muller code), or it may be partitioned into smaller information bit sequences. Each smaller sequence may be encoded by a linear error-correcting code (e.g., Reed-Muller code). The final output sequence may be obtained by interleaving the concatenation and circular repetition of the linear encoded sequences.

With respect to aperiodic CQI/PMI reporting (e.g., at 216), in some cases, APS feedback is transmitted only if the configured CSI feedback type supports APS reporting. The APS feedback may be transmitted with other CSI reporting, such as CQI, PMI, over NR uplink data channel. Example APS feedback types are described below, without limitation:

APS feedback type 0 (No APS): No APS reporting.

APS feedback type 1 (Single APS): A set of antenna ports is selected from the available antenna ports assuming transmission on the whole band.

APS feedback type 2 (Multiple APS): For each subband, a set of antenna ports is selected from the available antenna ports assuming transmission only in the subband.

In an example, the APS feedback type may be combined with the CQI feedback type and PMI feedback type to form an NR CSI reporting mode (e.g., Mode i-j-k, where i=1, 2, or 3 and indicates the CQI reporting type, j=0, 1, or 2 and indicates the PMI reporting type, and k=0, 1, or 2 and indicates the APS reporting time. In an example, i is set to: 1 to indicate a wideband report, 2 to indicate a UE-selected report, and 3 to indicate a higher-layer configured report. In an example, j is set to: 0 to indicate no PMI report, 1 to indicate a single PMI report, and 2 to indicate multiple PMI reports. In an example, k is set to: 0 to indicate no APS report, 1 to indicate a single APS report, and 2 to indicate multiple APS reports. The CQI and PMI may be calculated based on the selected antenna ports. In some cases, the NR CSI reporting mode may be configured by higher layer signaling.

With respect to periodic CSI Reporting with APS feedback, a given UE may be configured by higher layer to periodically feedback different CSI components including, for example, the APS report via PUCCH or other 5G control channels. Example APS feedback types are described below, presented without limitation:

APS feedback type 0 (No APS): No APS reporting, and UE reports CQI, PMI and/or RI based on all antenna ports.

APS feedback type 1 (Single APS): A set of antenna ports is selected from the available antenna ports assuming transmission on the whole band.

In some cases, the APS feedback type may be combined with the CQI feedback type and PMI feedback type to form an NR CSI reporting mode. (e.g., Mode i-j-k, where i=1, 2 indicates the CQI reporting type (e.g., 1 for wideband report and 2 for UE-selected report); j=0, 1 indicates the PMI reporting type (e.g., 0 for no PMI report and 1 for single PMI report); and k=0, 1 indicates the APS reporting type (e.g., 0 for no APS report and 1 for single APS report). CQI and PMI may be calculated based on the selected antenna ports. It will be understood that the NR CSI reporting modes may vary as desired. The NR CSI reporting mode is configured by higher layer signaling.

Example New NR uplink control channel reporting types for APS feedback are listed in Table 5 below, without limitation.

TABLE 5

Example PUCCH Reporting Types Related to APS Feedback

| PUCCH Reporting Type | Reported Item |
| --- | --- |
| 11 | APS |
| 14A | APS/RI |
| 14B | APS/PMI |
| 14C | APS/CQI |
| ... | ... |

For a UE configured with APS reporting, the periodicity $M_{APS}$ and relative offset $N_{OFFSET,APS}$ (in a given time unit for example subframes or time interval X or OFDM symbols) for APS reporting may be configured by higher layer signaling. For example, the information concerning the periodicity and relative offset of APS reporting may be provided by RRC signaling through a field aps-ConfigIndex, which can be a part of the CQI-ReportPeriodic in CQI-ReportConfig, as shown in Table 6. For example, examples of reporting instances for CQI, PMI, RI and APS are shown below:

In an example case where wideband CQI/PMI reporting is configured, the reporting interval of wideband CQI/PMI reporting is a period $N_{pd}$ (in the given time unit). The reporting instances for wideband CQI/PMI may be time units satisfying the following equation, where $n_t$ is the time unit index:

$(n_t - N_{OFFSET,CQI}) \mod(N_{pd}) = 0$.

In an example case in which RI reporting is configured, the reporting interval of RI reporting is an integer multiple $M_{RI}$ of period $N_{pd}$ (in the given time unit). The reporting instances for RI may be time units satisfying the following equation, for example:

$(n_t - N_{OFFSET,CQI} - N_{OFFSET,RI}) \mod(N_{pd} \cdot M_{RI}) = 0$.

In an example case in which APS reporting is configured, the reporting interval of APS reporting is an integer multiple $M_{APS}$ of period $N_{pd} \cdot M_{RI}$ (in the given time unit). The reporting instances for APS may be time units satisfying the following equation, for example:

$(n_t - N_{OFFSET,CQI} - N_{OFFSET,RI} - N_{OFFSET,APS}) \mod (N_{pd} \cdot M_{RI} \cdot M_{APS}) = 0$.

TABLE 6

Exemplary CQI-ReportConfig Information Element with Proposed APS Feedback

```
-- ASN1START
CQI-ReportConfig ::=           SEQUENCE {
   cqi-ReportModeAperiodic        CQI-ReportModeAperiodic    OPTIONAL,  -- Need OR
   nomPDSCH-RS-EPRE-Offset        INTEGER (-1..6),
   cqi-ReportPeriodic             CQI-ReportPeriodic   OPTIONAL          -- Need ON
}
...
CQI-ReportPeriodic ::= CHOICE {
   release                     NULL,
   setup                       SEQUENCE {
      cqi-PUCCH-ResourceIndex      INTEGER (0..1185),
      cqi-pmi-ConfigIndex          INTEGER (0..1023),
      cqi-FormatIndicatorPeriodic  CHOICE {
         widebandCQI                  NULL,
         subbandCQI                   SEQUENCE {
            k                            INTEGER (1..4)
         }
      },
      ri-ConfigIndex               INTEGER (0..1023)    OPTIONAL,  -- Need OR
      aps-ConfigIndex              INTEGER (0..1023)    OPTIONAL,
      simultaneousAckNackAndCQI    BOOLEAN
   }
}
CQI-ReportModeAperiodic ::=    ENUMERATED {
                                  rm12, rm20, rm22, rm30, rm31,
                                  rm32-v1250, rm10-v1310, rm11-v1310
}
...
-- ASN1STOP
```

An example that demonstrates the efficiency of the CSI feedback mechanisms is now described to further illustrate the described-herein embodiments, without limitation. By way of example, suppose the NR node/TRP 202 is equipped with 16 antenna ports, and legacy orthogonal CSI-RS is applied. The overheads of the legacy CSI report for the full channel and the proposed CSI report for the channel of the best 4 antenna ports can be compared. Assume that the periodicities of CQI/PMI and RI are 10 and 80 ms (subframes), and the selected antenna port indices are reported with the periodicity of 320 ms (subframes). Compared to the legacy CSI report, the overhead of CQI and RI reporting is the same, for example, because their periodicities and sizes are not changed. Thus, in this example, only the overhead reduction for PMI and antenna port selection reports is considered. In PMI calculation, the codebooks defined in Release 14 may be used, and the size of the PMI may be 8 bits and 11 bits for 4 and 16 antenna ports, respectively.

Continuing with the example, if a periodic CSI report is configured for a UE-selected CSI report, the total bandwidth may be divided into multiple, for instance 4, bandwidth parts. In an example, the UE reports CQI and PMI for each bandwidth part to cycle through the four bandwidth parts. For the legacy CSI report, the total bits for PMI reports for 16 antenna ports in every 320 subframes is 11×4×32=1408 bits. For one embodiment described above, when the UE reports the antenna port selection for the wideband, the total bits in every 320 subframes is 8×4×32+11=1035, where the 11 bits are for the antenna port index report as described above. Thus, in the example, the total bits for PMI reports is 26.5% less than that for the legacy PMI report, and it is recognized herein that the savings can be greater, for instance as applied to a larger antenna array.

If a periodic CSI report is configured for a wideband CSI report, the single CQI and single PMI may be reported for the whole band. For legacy CSI report, in some cases, the total bits for PMI reports for 16 antenna ports in every 320 subframes is 11×32=352 bits. In contrast, in an example embodiment, the total bits in every 320 subframes is 8×32+11=267, where the 11 bits are for the antenna port index report as described above. Thus, in an example, the total bits for PMI reports are 24.1% less than that for the legacy PMI report, and it is recognized herein that the savings can be greater, for instance as applied to a larger antenna array.

Thus, as shown, the bit size for PMI reporting may be reduced and the efficiency may depend on the details of configuration, antenna port selection, and reporting mechanisms. It will be appreciated that the above-described embodiments can also be applied to other CSI-RS schemes, such as KP-based CSI-RS and beamformed CSI-RS schemes.

Figure 3:
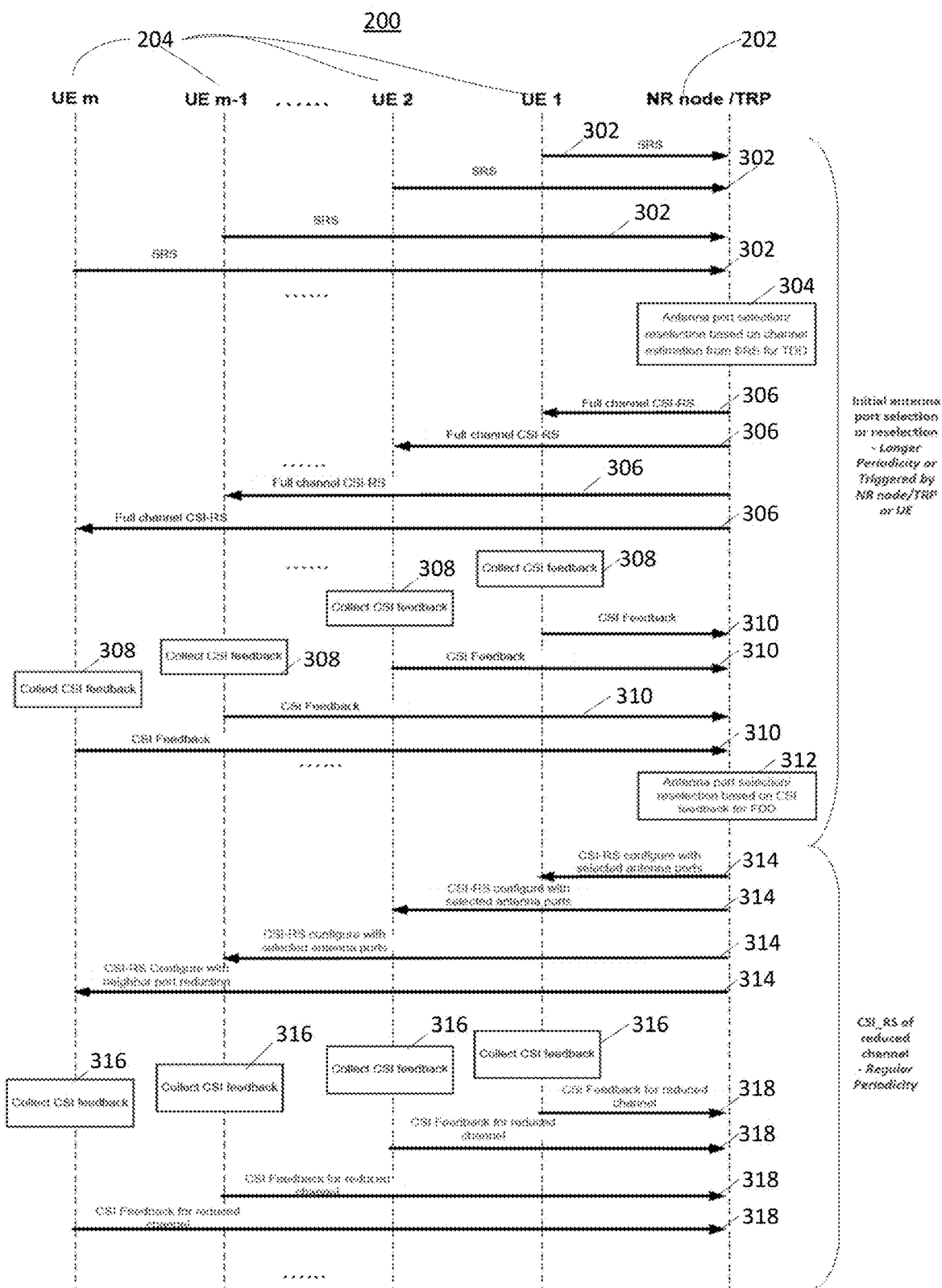
FIG. 3 is a call flow for CSI feedback with network-centric antenna port selection in accordance with an example embodiment.

Referring now to FIG. 3, an example of CSI Feedback with network-centric Antenna Port Selection is shown in the example system 200. In accordance with the illustrated embodiment, a new CSI feedback mechanism reduces CSI feedback overhead with network-centric antenna port selection. As shown, the NR node 202 may obtain the full uplink channel estimation, at 302, from the uplink sounding reference signals (SRS) transmitted by each of the UEs 204. It may be performed periodically with a long duration or aperiodically. In some cases, for a time division duplex (TDD) system, the NR node 202 takes advantage of the full channel reciprocity feature by using the uplink channel CSI obtained from the uplink SRS (received at 302) as the downlink channel CSI. Then, the NR node 202 can perform antenna port selection at 304 using the received CSI. In some cases, for a frequency division duplex (FDD) system, the NR node 202 transmits (e.g., at 306) the NR CSI-RS on all antenna ports, and the UEs 204 may feedback the CSI report (e.g., at 310) based on the processing of the received CSI-RS.

Still referring to FIG. 3, based on the full channel estimation received at 310, the NR node 202 selects (at 312) the best antenna ports according to, for example, the pre-defined criteria. The APSC for NR node/TRP-centric antenna port selection may be the same as that for UE-centric antenna port selection described above with reference to FIG. 2. Alternatively, or additionally, the NR node 202 may also consider other criteria, e.g., assigning two UEs to different beams to mitigate interference between them. In some cases, for example at 314, the NR node 202 only transmits the NR CSI-RS and downlink data on the antenna ports selected at 312 and/or 304. In accordance with the example, the UE calculates (e.g., at 316) and reports CQI and/or PMI and RI (e.g., at 318) only based on the current antenna port selection until the next antenna port re-selection is performed. The antenna port re-selection may be scheduled periodically, or triggered by the NR node 202 or one or more of the UEs 204. The NR node 202 can configure CSI-RS resources via RRC signaling, for example, and dynamically activate selected CSI-RS resources to the UE 204 via a DCI indication. Thus, the UE 204 may measure those CSI-RS resources dynamically allocated/configured by NR node 202. In addition, in some cases, the UE 204 can jointly feedback to the NR node 202, with CQI and/or PMI, RI, CSI-RS identification based on best-M CSI-RS. The M value can be specified via configuration initially by RRC signalings or via MAC CE. Because the value M value can be configured by the NR node 202, the NR node 202 may know the joint CSI feedback information. In some cases, the joint CSI feedback information can be jointly encoded by using polar coding. For example, the NR node 202 can activate N=8 CSI-RS for the UE 204 performing CSI measurement, and can report the best M=2 for CSI reporting. In an example, the UE 204 uses a bit mapping ($b_{N-1}$ $b_{N-2}$ ... $b_0$) to indicate which configured CSI-RS resources are fed back. For example, the CSI feedback information can be constructed as ($b_{N-1}$ $b_{N-2}$ ... $b_0$)+($d_{1,Q-1}$ $d_{1,Q-2}$ ... $d_{1,0}$)+ ... +($d_{M,Q-1}$ $d_{M,Q-2}$ ... $d_{M,0}$), where $d_{i,j}$ denotes the j-th feedback bits of i-th CSI-RS, $1 \leq i \leq N$.

An initial antenna port selection or an antenna port reselection may be triggered by the NR node/TRP 202 or the UEs 204. A new field (e.g, "aps-trigger") may be defined with the length of 1 bit (or more). In an example, it may be signaled as a new field in DCI (or UCI) formats via downlink (uplink) control channel or RRC signaling or via a MAC CE. Upon receiving the trigger, the NR node/TRP may perform the above-described steps to reselect antenna ports.

It will be understood that the embodiment described with reference to FIG. 3 can further reduce the overhead of CSI feedback, for example, because the antenna port index report might not be necessary, in some cases. Therefore, even with a large number of transmit antenna ports, the CSI report overhead can be reduced significantly.

Turning now to CSI Feedback to Support Beam Sweeping and Beamforming Training, in 5G, beamforming training is a procedure to discover the best beam direction between the transmitter and receiver pair. Beamforming training begins with the NR node transmitting the RS through all available beams or a subset of available beams, and a given UE feeds back the index of the best beam. Then, in typical beamforming training, the NR node continues to send out the RS through narrower beams or neighboring beams according to UE's feedback to enable further aligning or tuning of the beam directions. Enhanced CSI feedback to support beam sweeping and beamforming training is now described, in accordance with an example embodiment. By way of example, referring to the example system 200, the NR node 202 can configure certain CSI-RS resources (e.g., (via RRC signaling or MAC-CE), and can use DCI to dynamically activate those configured CSI-RS resources for the UE 204. The configured CSI-RS resources can be from a TRP or multiple TRPs. In some cases, the configured CSI-RS resources can be dynamically activated via a primary TRP and/or secondary TRPs. In an example, if the UE 204 has to report more than 2 CSI feedbacks, and those CSI feedbacks are coming from different TRPs, then the beam ID and the TRP identity (ID) may be associated with the CSI report, which may also include CQI and/or PMI, RI. In some cases, the TRP ID can be indicated via the configuration of the CSI reference signal.

In an example, the feedback report is configured by higher layers and contains the beam index (BI) and the corresponding CQI on the uplink control channel or data channel. Example CSI reporting modes are given in Table 7 below, presented without limitation:

TABLE 7

Example CQI and BI Feedback Types for Example CSI Reporting Modes to Support Beam Sweeping and Beamforming Training

|  |  | Beam Index Feedback Type | |
|---|---|---|---|
|  |  | No BI | Single BI |
| CQI Feedback Type | Wideband (wideband CQI) | Mode 4-0 | Mode 4-1 |
|  | UE Selected (subband CQI) | Mode 5-0 | Mode 5-1 |

Referring to Table 7, the UE may report M BIs and/or CQIs, where M is configurable. In some cases, the CQI might not need to be reported. Thus, in some cases, the UE may report the BI only or the BI and the CQI. In an example, the channel coding for the BI may be chosen for high reliability. Further, when a given UE detects beams from different transmission/reception points (TRP), it may feedback the TRP index in addition to the BI to enable multiple points of transmission or reception. Still referring to Table 7, with respect to Mode 4-1, the wideband CQI may be calculated assuming the transmission is on the whole band with the reported beam. For Mode 5-1, the subband CQI may be calculated, for example, assuming the transmission is only on the corresponding subband with the reported beam. For a different subband, the UE may report difference beam indices. After receiving the UE's report, the NR node may choose the best beam for data transmission, or the UE may choose a beam based on other performance factors associated with the UE. During data transmission, the UE or NR node may request beam re-selection for various reasons such as, for example and without limitation, performance degradation or location change. The beam re-selection may start with a new beam sweep or beamforming training. In some cases, when the UE decides to request a beam re-selection, it may feedback a two-bit information "beamReselectionRequest" through the NR uplink control channel, where the first bit indicates the request, and the second bit indicates whether the reselection starts from a beam sweep stage. The channel coding of the beam re-selection request may be chosen for high reliability. The beam re-selection may also be configured by higher layer signaling such as RRC signaling or via a MAC CE. By way of example, a new field "beamReselectionPeriod" is defined herein to indicate the periodicity of an example beam re-selection. The "beamReselectionRequest" feedback can be jointly feedback, for example, when UE 204 monitors multiple TRPs and each TRP configures different CSI-RS resources for the UE 204, while performing beam management.

Thus, in an example embodiment, an apparatus (e.g., a UE) may select one or more beams from a plurality of beams provided by at least one node in the network. The apparatus may send, to the at least one node, a beam index feedback with a channel state information (CSI) report that indicates the selected one or more beams. The apparatus may receive, until a beam is reselected, a channel state information reference signal and downlink (DL) data via only the selected one or more beams. Further, in some cases, the apparatus may detect a plurality of beams from a plurality of nodes. Thus, the apparatus may send, to the plurality of nodes, an index (e.g., TRP ID) associated with each node that is associated with at least one of the one or more selected beams. In an example, the CSI report includes a respective index associated with a preconfigured number of beams. The apparatus may also send a beam re-selection request, via an uplink control channel, to the at least one node. As described above, the beam re-selection request may include a first bit that indicates that the beam should be re-selected, and a second bit that indicates whether the beam should be re-selected using a new beam sweep. The beam may be re-selected in accordance with a preconfigured periodicity.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive recall, disaster alerts, real-time gaming, multi-person video calls, autonomous driving, augmented reality, tactile internet, and virtual reality to name a few. All of these use cases and others are contemplated herein.

Figure 4A:
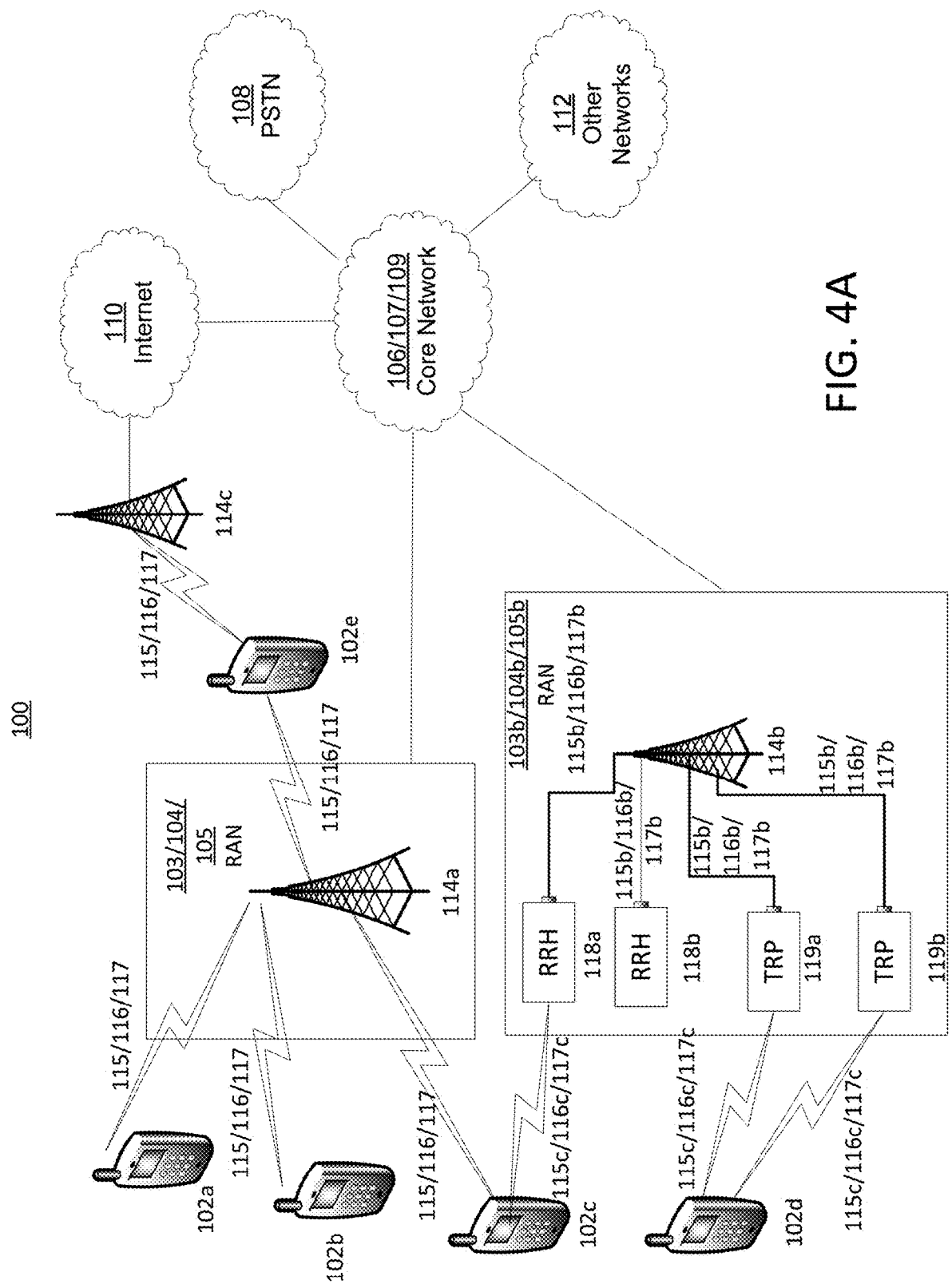
FIG. 4A illustrates one embodiment of an example communications system in which the methods and apparatuses described and claimed herein may be embodied.

FIG. 4A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 4A-4E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b* and/or TRPs 119*a*, 119*b* over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b* and/or TRPs 119*a*, 119*b* may communicate with one or more of the WTRUs 102*c*, 102*d* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 using Long Term Evolution (LTE) and/or LTE-Advanced (LTE-A). In the future, the air interface 115/116/117 may implement 3GPP NR technology.

In an embodiment, the base station 114*a* and the WTRUs 102*a*, 102*b*, 102*c* may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 4A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e* may implement a radio technology such as IEEE 802.11 to establish a wireless local area network (WLAN). In an embodiment, the base station 114*c* and the WTRUs 102*e* may implement a radio technology such as IEEE 802.15 to establish a wireless personal area network (WPAN). In yet an embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 4A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 4A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 4A may be configured to communicate with the base station 114a, which may employ a cellular-based radio technology, and with the base station 114c, which may employ an IEEE 802 radio technology.

Figure 4B:
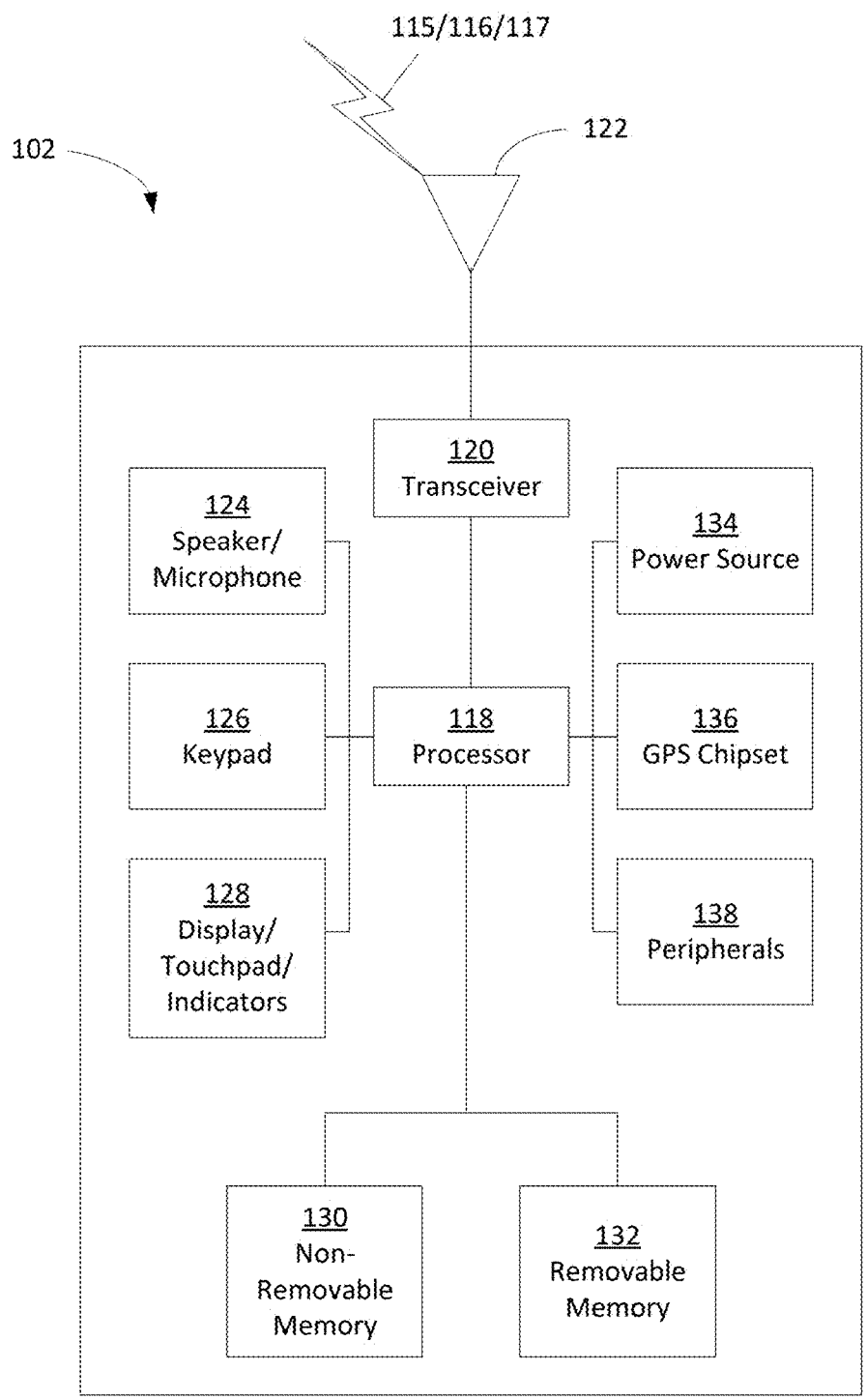
FIG. 4B is a block diagram of an example apparatus or device configured for wireless communications in accordance with the embodiments illustrated herein.

FIG. 4B is a block diagram of an example apparatus or device configured for wireless communications in accordance with the embodiments illustrated herein, such as for example, a WTRU 102. As shown in FIG. 4B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 4B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 4B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 4A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 4A may be configured to communicate with the base station 114a, which may employ a cellular-based radio technology, and with the base station 114b, which may employ an IEEE 802 radio technology.

FIG. 4B is a block diagram of an example apparatus or device configured for wireless communications in accordance with the embodiments illustrated herein, such as for example, a WTRU 102. As shown in FIG. 4B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 4B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 4B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 4B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 4C:
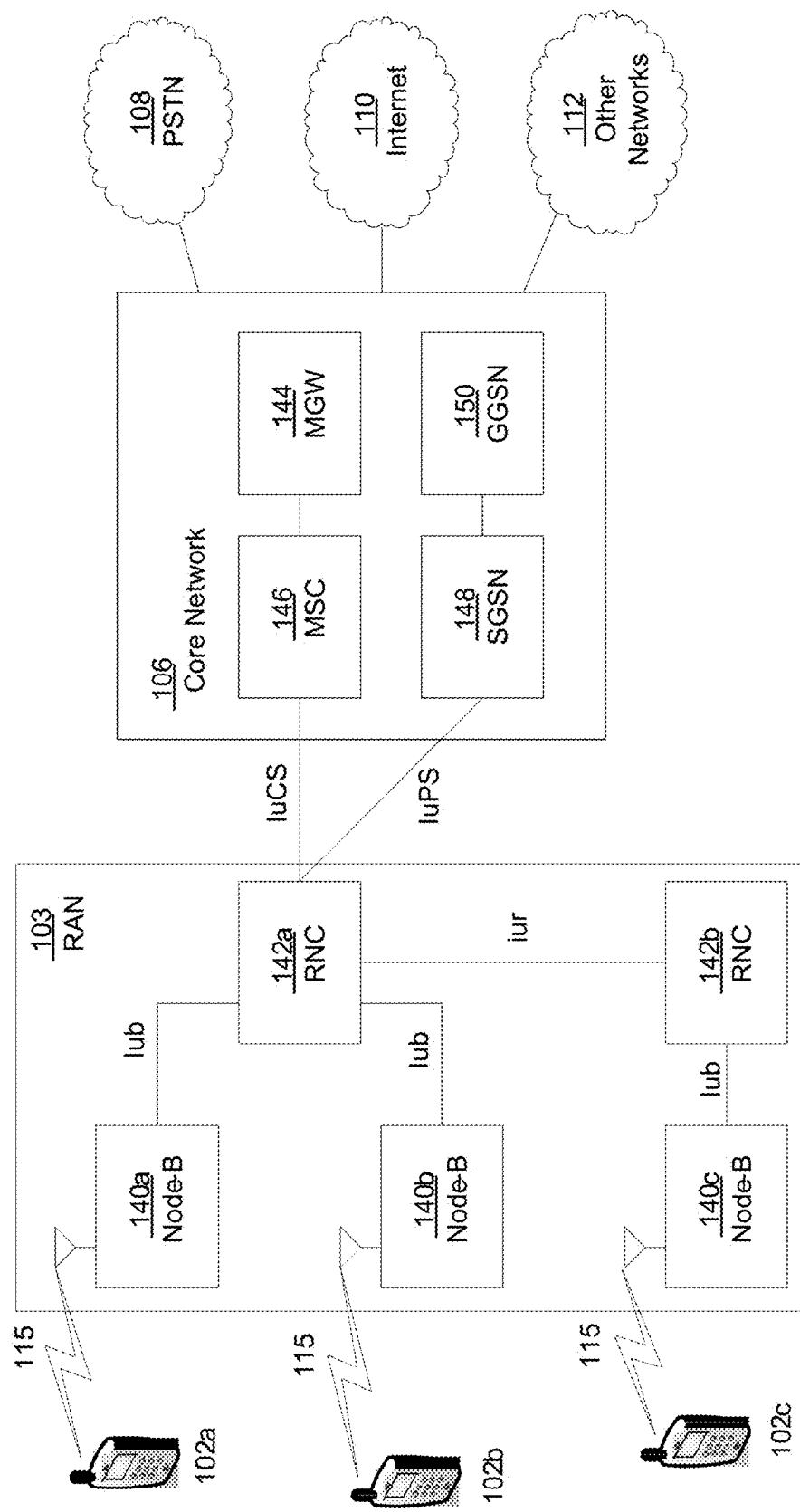
FIG. 4C is a system diagram of an example radio access network (RAN) and core network in accordance with an example embodiment.

FIG. 4C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 4C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 4C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 4C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 4D:
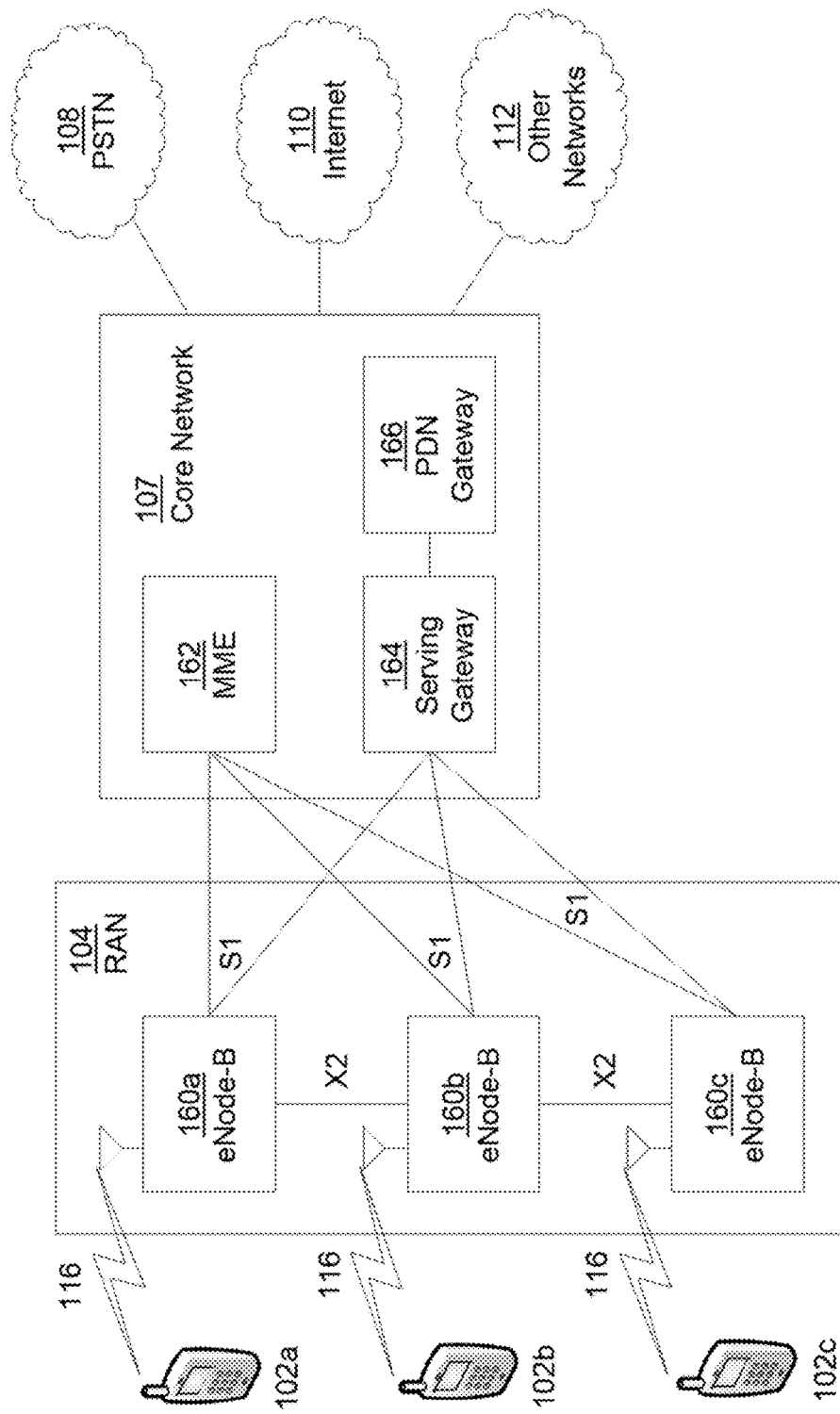
FIG. 4D is another system diagram of a RAN and core network according to another embodiment.

FIG. 4D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 4D, the eNode-Bs 160a, 160b, 160c may communicate with one another over an X2 interface.

The core network 107 shown in FIG. 4D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 4E:
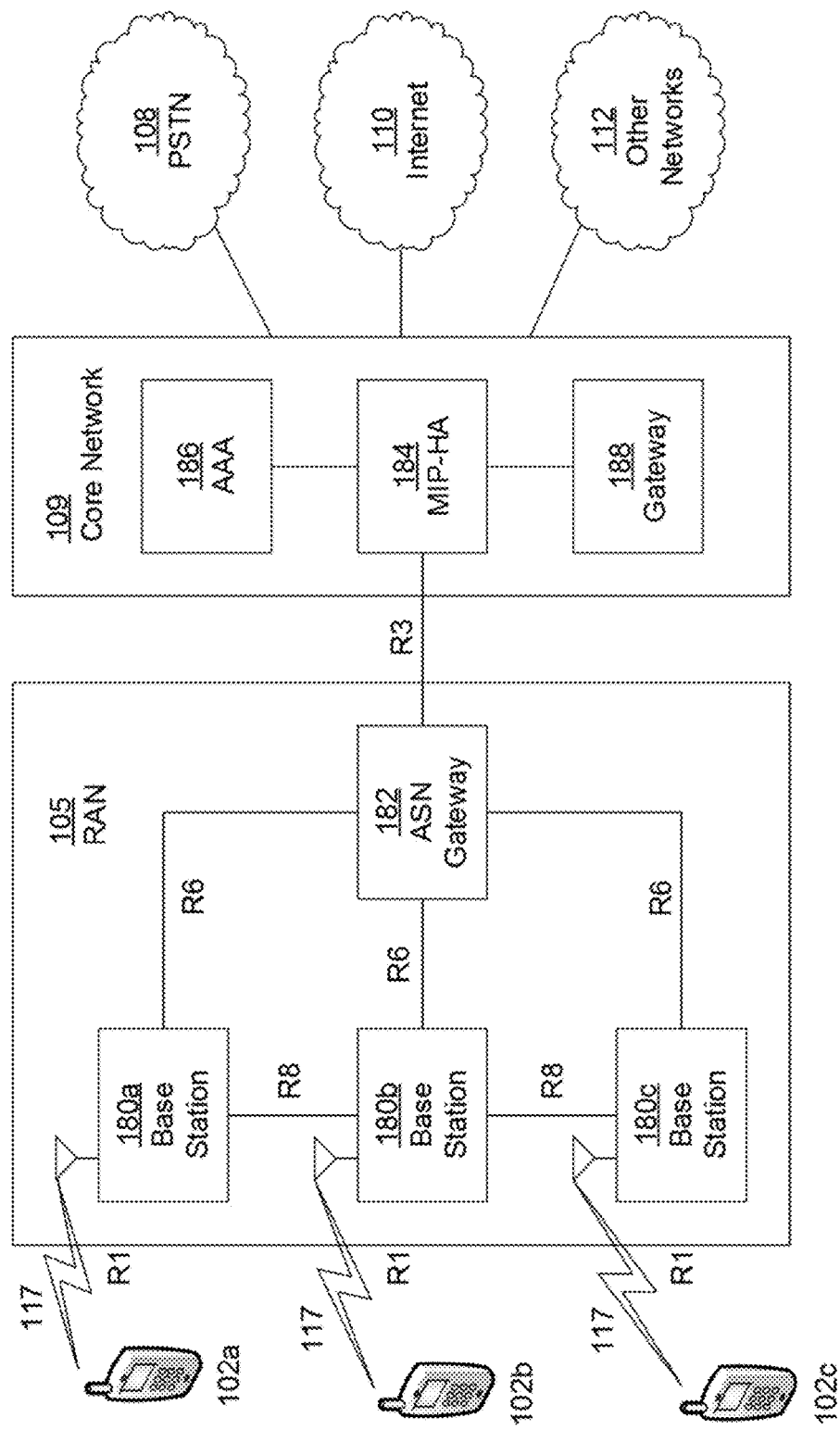
FIG. 4E is another system diagram of a RAN and core network according to another embodiment.

FIG. 4E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 4E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 4E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 4E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 4A, 4C, 4D, and 4E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 4A, 4B, 4C, 4D, and 4E are provided by way of example only, and it is understood that the subject matter disclosed and claimed herein may be embodied or implemented in any similar communication system, whether presently defined or defined in the future.

Figure 4F:
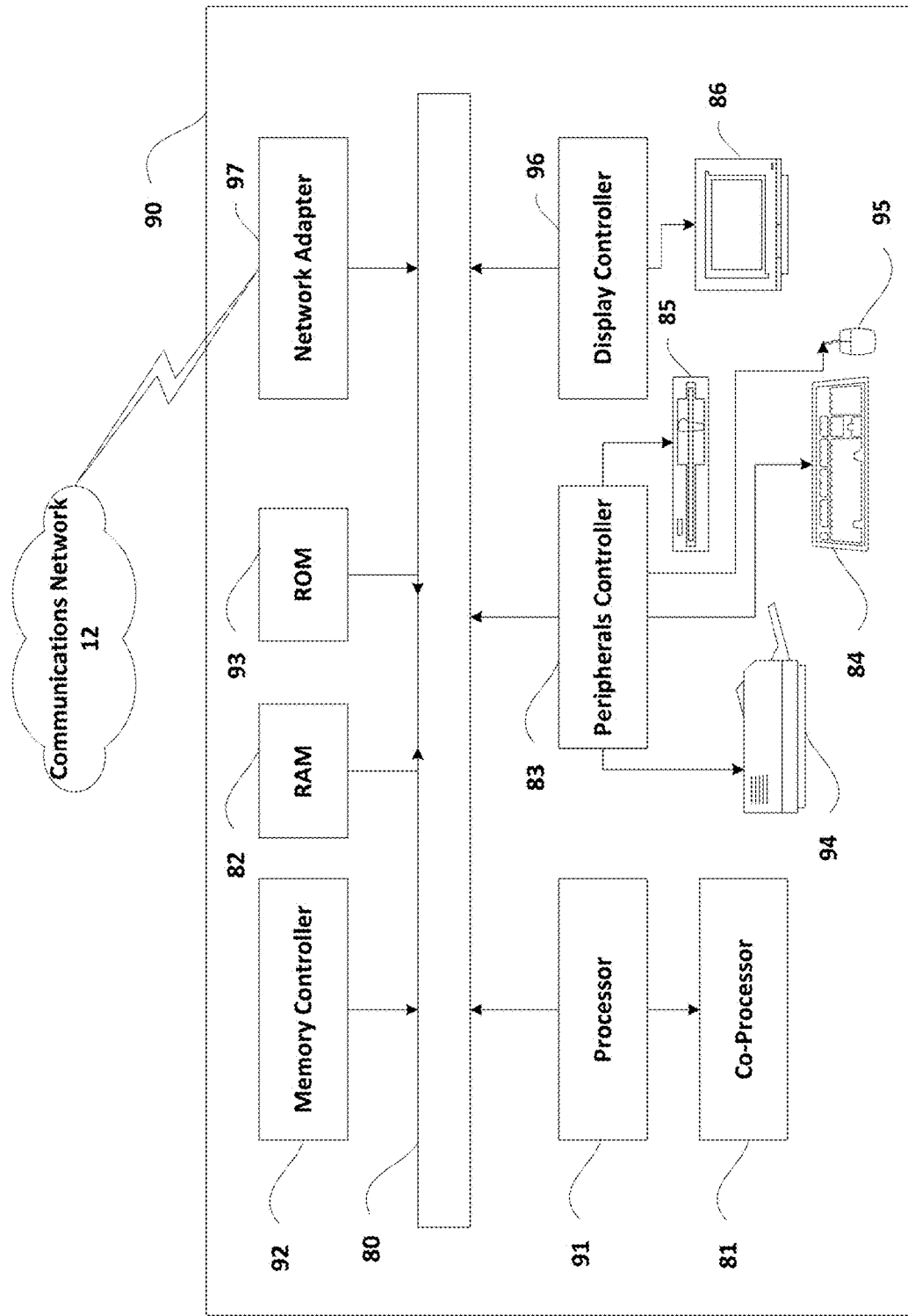
FIG. 4F is a block diagram of an exemplary computing system 90 in which one or more apparatuses of the communications networks illustrated in FIGS. 2-4E may be embodied.

FIG. 4F is a block diagram of an exemplary computing system 90 in which one or more apparatuses of the communications networks illustrated in FIGS. 4A, 4C, 4D and 4E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 4A, 4B, 4C, 4D, and 4E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to service level technologies that may appear in the above description. Unless otherwise specified, the acronyms used herein refer to the corresponding term listed below.
AAS Active Antenna System
AoA Angle or Arrival
AoD Angle of Departure
AS Access Stratum
CE Control Element
CoMP Coordinated Multipoint
CP Cyclic Prefix
CQI Channel Quality Indication
CRS Cell-specific Reference Signals
CSI Channel State Information
CSI-RS Channel State Information Reference Signals
DCI Downlink Control Information
DL DownLink
DM-RS Demodulation Reference Signals
eMBB enhanced Mobile Broadband
eNB evolved Node B
ePDCCH Enhanced Physical Downlink Control CHannel
FD Full-Dimension
FDD Frequency Division Duplex
FFS For Further Study
GUI Graphical User Interface
HARQ Hybrid Automatic Repeat Request
ID Identification
IMT International Mobile Telecommunications
KP Kronecker-Product
KPI Key Performance Indicators
LTE Long term Evolution
MCL Maximum Coupling Loss
MCS Modulation and Coding Scheme
MME Mobility Management Entity
MIMO Multiple-Input and Multiple-Output
NAS Non-Access Stratum
NB Narrow Beam
NDI New Data Indicator
NEO NEtwork Operation
OCC Orthogonal Cover Codes
OFDM Orthogonal Frequency Division Multiplexing
PDCCH Physical Downlink Control Channel
PDSCH Physical Downlink Shared Channel
PMI Precoder Matrix Indication
PRS Positioning Reference Signals
PUSCH Physical Uplink Shared Channel
PUCCH Physical Uplink Control Channel
RB Resource Block
RE Resource Element
RI Rank Indication
RRC Radio Resource Control
RS Reference Signal
RSSI Received Signal Strength Indicator
RSRP Reference Signal Received Power
RSRQ Reference Signal Received Quality
RV Redundancy Version
SISO Single-Input and Single-Output
SRS Sounding Reference Signal
2D Two-Dimensional
3D Three-Dimensional
TDD Time Division Duplex
TPC Transmit Power Control
TRP Transmission and Reception Point
UE User Equipment
UL UpLink
URLLC Ultra-Reliable and Low Latency Communications
WB Wide Beam
WRC Wireless Planning Coordination This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:

receiving, via Radio Resource Control (RRC) signaling, a Channel State Information (CSI) report configuration indicating a feedback type for a CSI reference signal, the CSI report configuration being associated with information indicating one or more antenna ports;

selecting one or more antenna ports from a plurality of antenna ports to communicate with at least one node in the network;

sending, to the at least one node, a feedback with a CSI report that indicates the selected one or more antenna ports based on the CSI report configuration;

receiving, until an antenna port is reselected, a CSI reference signal and downlink (DL) data via the selected one or more antenna ports; and sending an antenna port re-selection request, via a Physical Uplink Control CHannel (PUCCH), to the at least one node, wherein the antenna port re-selection request comprises a first bit that indicates that the antenna port should be re-selected.

2. The apparatus of claim 1, wherein the one or more antenna ports are associated with one or more beams.

3. The apparatus of claim 2, wherein the plurality of beams are provided by a plurality of nodes in the network, and the apparatus further comprises computer-executable instructions stored in the memory of the apparatus which, when executed by the processor of the apparatus, cause the apparatus to perform further operations comprising:

detecting the plurality of beams from the plurality of nodes; and sending, to the plurality of nodes, an index associated with each node that is associated with at least one of the one or more selected beams.

4. The apparatus of claim 2, wherein the CSI report comprises a respective index associated with a preconfigured number of beams.

5. The apparatus of claim 1, wherein the antenna port is re-selected in accordance with a preconfigured periodicity.

6. A network node comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:

transmitting, via Radio Resource Control (RRC) signaling, a Channel State Information (CSI) report configuration indicating a feedback type for a CSI reference signal, the CSI report configuration being associated with information indicating one or more antenna ports;

receiving, from a user device, a feedback with a CSI report that indicates one or more antenna ports selected by the user device based on the CSI report configuration;

transmitting a CSI reference signal and downlink (DL) data so that the user device can receive the CSI reference signal and DL data via the one or more antenna ports; and receiving an antenna port re-selection request, via a Physical Uplink Control CHannel (PUCCH), from the user device, wherein the antenna port re-selection request comprises a first bit that indicates that the antenna port should be re-selected.

7. The network node of claim 6, wherein the one or more antenna ports are associated with one or more beams.

8. The network node of claim 7, wherein the plurality of beams are provided by a plurality of nodes in the network, and the apparatus further comprises computer-executable instructions stored in the memory of the apparatus which, when executed by the processor of the apparatus, cause the apparatus to perform further operations comprising:

detecting the plurality of beams from the plurality of nodes; and sending, to the plurality of nodes, an index associated with each node that is associated with at least one of the one or more selected beams.

9. The network node of claim 7, wherein the CSI report comprises a respective index associated with a preconfigured number of beams.

10. The network node of claim 6, wherein the antenna port is re-selected in accordance with a preconfigured periodicity.

11. A method for wireless communication comprising:

transmitting, via Radio Resource Control (RRC) signaling, a Channel State Information (CSI) report configuration indicating a feedback type for a CSI reference signal, the CSI report configuration being associated with information indicating one or more antenna ports;

receiving, from a user device, a feedback with a CSI report that indicates one or more antenna ports selected by the user device based on the CSI report configuration;

transmitting a CSI reference signal and downlink (DL) data so that the user device can receive the CSI reference signal and DL data via the one or more antenna ports; and receiving an antenna port re-selection request, via a Physical Uplink Control CHannel (PUCCH), from the user device, wherein the antenna port re-selection request comprises a first bit that indicates that the antenna port should be re-selected.

\* \* \* \* \*